United States Patent
Kim et al.

(10) Patent No.: US 12,205,323 B2
(45) Date of Patent: Jan. 21, 2025

(54) APPARATUS FOR ESTIMATING CAMERA POSE USING MULTI- VIEW IMAGE OF 2D ARRAY STRUCTURE AND METHOD USING SAME

(71) Applicants: ELECTRONICS AND TELECOMMUNICATIONS RESEARCH INSTITUTE, Daejeon (KR); SOGANG UNIVERSITY RESEARCH FOUNDATION, Seoul (KR)

(72) Inventors: Joon-Soo Kim, Daejeon (KR); Kug-Jin Yun, Daejeon (KR); Jun-Young Jeong, Daejeon (KR); Suk-Ju Kang, Seoul (KR); Jung-Hee Kim, Seoul (KR); Woo-June Park, Seoul (KR)

(73) Assignees: ELECTRONICS AND TELECOMMUNICATIONS RESEARCH INSTITUTE, Daejeon (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 319 days.

(21) Appl. No.: 17/702,258

(22) Filed: Mar. 23, 2022

(65) Prior Publication Data
US 2023/0014096 A1    Jan. 19, 2023

(30) Foreign Application Priority Data

Jul. 16, 2021 (KR) ........................ 10-2021-0093404

(51) Int. Cl.
*G06T 7/73* (2017.01)
(52) U.S. Cl.
CPC ...... *G06T 7/74* (2017.01); *G06T 2207/30244* (2013.01)

(58) Field of Classification Search
CPC . G06T 7/74; G06T 2207/30244; G06T 7/596; G06T 7/593; G06T 7/80; H04N 13/239; H04N 13/271
See application file for complete search history.

(56) References Cited

U.S. PATENT DOCUMENTS

| 9,875,545 B2 | 1/2018 | Rhee et al. |
| 10,565,726 B2 | 2/2020 | Lindner et al. |

(Continued)

FOREIGN PATENT DOCUMENTS

| KR | 10-2007-0075031 | 7/2007 |
| KR | 10-2015-0006958 | 1/2015 |

OTHER PUBLICATIONS

Changchang Wu, "Towards Linear-time Incremental Structure from Motion," International Conference on 3D Vision—3DV 2013, Jun. 29, 2013, pp. 1-8.

(Continued)

*Primary Examiner* — Iriana Cruz
(74) *Attorney, Agent, or Firm* — KILE PARK REED & HOUTTEMAN PLLC

(57) ABSTRACT

Disclosed herein are an apparatus for estimating a camera pose using multi-view images of a 2D array structure and a method using the same. The method performed by the apparatus includes acquiring multi-view images from a 2D array camera system, forming a 2D image link structure corresponding to the multi-view images in consideration of the geometric structure of the camera system, estimating an initial camera pose based on an adjacent image extracted from the 2D image link structure and a pair of corresponding feature points, and estimating a final camera pose by reconstructing a 3D structure based on the initial camera pose and performing correction so as to minimize a reprojection error of the reconstructed 3D structure.

16 Claims, 14 Drawing Sheets

(56) References Cited

U.S. PATENT DOCUMENTS

| | | | |
|---|---|---|---|
| 10,805,535 B2 | 10/2020 | Dal Mutto et al. | |
| 11,064,116 B2 | 7/2021 | Adsumilli et al. | |
| 2009/0268033 A1* | 10/2009 | Ukita | G06T 7/292 |
| | | | 348/169 |
| 2012/0194644 A1 | 8/2012 | Newcombe et al. | |
| 2014/0105486 A1* | 4/2014 | Tamaazousti | G06T 7/74 |
| | | | 382/154 |
| 2016/0227207 A1 | 8/2016 | Lee | |
| 2018/0113469 A1* | 4/2018 | Madison | G01C 21/1656 |
| 2019/0164301 A1 | 5/2019 | Kim | |
| 2020/0279402 A1 | 9/2020 | Cheng et al. | |
| 2020/0309542 A1* | 10/2020 | Haug | G05D 1/0236 |
| 2021/0349469 A1* | 11/2021 | Houseago | B25J 9/1697 |
| 2022/0012494 A1* | 1/2022 | Butterfield | G06T 7/73 |
| 2022/0301192 A1* | 9/2022 | Boardman | G06T 7/579 |

OTHER PUBLICATIONS

Johannes L. Schönberger et al., "Structure-from-Motion Revisited," CVPR, 2016, pp. 4104-4113.

Woojune Park et al., "Structured Camera Pose Estimation for Mosaic-based Omnidirectional Imaging," IEEE International Symposium on Circuits and Systems, 2021.

Feng Liu et al., "A camera self-calibration method based on dual constraints of multi-view images", 2011 International Conference on Wireless Communications and Signal Processing (Nov. 9-11, 2011).

Anqi Joyce Yang et al., "Asynchronous Multi-View SLAM", 2021 IEEE International Conference on Robotics and Automation (May 30-Jun. 5, 2021).

* cited by examiner

Algorithm 1 2D Image Registration & Triangulation
---

Input: $\chi^{2D}$, $P^0$
    Output: $\chi^{3D}$, $P^N$
1: function STRUCT$(r_i, t_i, x_i, t_j, x_j, M_{i,j})$
2:     TRIANGULATEPOINTS$(r_i, t_i, x_i, t_j, x_j, M_{i,j})$
3:     return $\hat{X}_{i,j}$
4: end function
5: for image $I_i = 1, 2, \ldots, N$ do
6:     $\hat{X}_{j,i+1} = $ STRUCT$(r_i, t_i, X_i, r_{i+1}, t_{i+1}, X_{i+1}, M_{i,i+1})$
7:     $\hat{X}_{j,i+L} = $ STRUCT$(r_i, t_i, X_i, r_{i+L}, t_{i+L}, X_{i+L}, M_{i,i+L})$
8:     $\hat{X}_{j,i+1,i+L}, P^i = $ FUSESTRUCT$(\hat{X}_{i,i+1}, \hat{X}_{i,i+L}, P^{i-1})$
9:     append $\hat{X}_{i,i+1,i+L}$ to $\chi^{3D}$
10: end for
11: return $\chi^{3D}$, $P^N$

APPARATUS FOR ESTIMATING CAMERA POSE USING MULTI- VIEW IMAGE OF 2D ARRAY STRUCTURE AND METHOD USING SAME

CROSS REFERENCE TO RELATED APPLICATION

This application claims the benefit of Korean Patent Application No. 10-2021-0093404, filed Jul. 16, 2021, which is hereby incorporated by reference in its entirety into this application.

BACKGROUND OF THE INVENTION

1. Technical Field

The present invention relates generally to camera pose estimation technology, and more particularly to technology capable of improving accuracy of 3D information reconstruction using geometric information of a 2D array structure, in which the structural characteristics of an imaging tool are taken into consideration, and enabling camera pose information estimation for sophisticated mosaic-based omnidirectional imaging.

2. Description of the Related Art

These days, with the development of Virtual-Reality (VR) devices, the demand for experiencing realistic VR content in a high-resolution VR device is increasing, and realistic renderings according to a change in the viewpoint of a user wearing a VR device based on high-resolution image information and a precise image depth map are required. Also, with regard thereto, omnidirectional camera technology for capturing a high-resolution omnidirectional image in an actual environment is receiving a lot of attention.

In order to acquire an omnidirectional image, various omnidirectional cameras and devices, such as a single fish-eye lens camera, a multiple-camera device for capturing different ranges, and the like, are commonly used. These days, in order to configure high-resolution VR image content, technology for making an omnidirectional image by synthesizing images captured using multiple high-resolution cameras using a mosaic method is required. Mosaic-based omnidirectional imaging enables not only generation of an omnidirectional image through simple matching but also detection of precise 3D spatial information, such as a precise depth map and the like, through inverse rendering using the difference between images. Here, in order to detect precise depth maps of individual images, precise camera pose information pertaining to each of the acquired images is required.

Documents of Related Art (Patent Document 1) Korean Patent Application Publication No. 10-2015-0006958, published on Jan. 20, 2015 and titled "Apparatus and method for camera pose estimation".

SUMMARY OF THE INVENTION

An object of the present invention is to provide a method for estimating camera pose information for mosaic-based omnidirectional imaging that is more sophisticated than conventional technology.

Another object of the present invention is to estimate a precise 3D pose of a camera pertaining to each of multi-view images, acquired from a camera system capable of capturing images in a 2D array structure, in consideration of the 2D geometric structure of the images.

A further object of the present invention is to improve the accuracy of 3D information reconstruction using not only an existing progressive Structure-from-Motion (SfM) method but also geometric information of an array structure, in which the structural characteristics of an imaging tool are taken into consideration, in each of a multi-view-based 3D space reconstruction process and an optimization process.

Yet another object of the present invention is to form a pair of corresponding feature points between adjacent images in consideration not only of an adjacent image located in the same row in a 2D array but also of an adjacent image located in the same column in the 2D array, thereby precisely estimating initial camera pose information and 3D spatial information.

Still another object of the present invention is to estimate a camera pose with high accuracy by proposing constraints on a relative rotation vector between adjacent cameras through the process of optimizing bundle adjustment of 3D parameters and to acquire a more accurate result when an algorithm for estimating a pixel-based depth map using the estimated pose is used.

In order to accomplish the above objects, a method for estimating a camera pose, performed by an apparatus for estimating a camera pose, according to the present invention includes acquiring multi-view images from a 2D array camera system; forming a 2D image link structure corresponding to the multi-view images in consideration of the geometric structure of the camera system; estimating an initial camera pose based on an adjacent image extracted from the 2D image link structure and a pair of corresponding feature points; and reconstructing a 3D structure based on the initial camera pose and estimating a final camera pose by performing correction so as to minimize a reprojection error of the reconstructed 3D structure.

Here, estimating the final camera pose may include reconstructing an initial 3D structure through triangulation using the initial camera pose and the pair of corresponding feature points; calculating the value of a cost function representing a mismatch between a 2D image and a 3D structure by reprojecting 3D points forming the initial 3D structure onto an individual view; and correcting the initial camera pose and the initial 3D structure so as to decrease the value of the cost function.

Here, forming the 2D image link structure may include classifying positions of camera views corresponding to the multi-view images into loops that do not overlap each other; and selecting an adjacent image for each of the camera views corresponding to the multi-view images.

Here, the adjacent image may be an image having an overlapping view, the extent of which is equal to or greater than a preset extent.

Here, a collection of adjacent images corresponding to a specific camera view may include view images immediately preceding and following the specific camera view on a loop including the specific camera view, and when an adjacent view that does not correspond to the loop including the specific camera view is present, the collection may include at least one of view images immediately preceding and following the adjacent view on a loop including the adjacent view.

Here, the cost function may include a term for restricting a distance between cameras forming the camera system by imposing a penalty for a deviation in the distance between cameras.

Here, correcting the initial camera pose and the initial 3D structure may include eliminating a 3D point outlier by setting a suitable depth range so as to correspond to a multiple of a distance between cameras forming the camera system.

Here, correcting the initial camera pose and the initial 3D structure may include performing loop-closure-based accumulated error compensation based on a distance between cameras forming the camera system.

Here, estimating the initial camera pose may comprise estimating an essential matrix based on the pair of corresponding feature points and estimating the initial camera pose by decomposing the essential matrix.

Also, an apparatus for estimating a camera pose according to an embodiment of the present invention includes a processor for acquiring multi-view images from a 2D array camera system, forming a 2D image link structure corresponding to the multi-view images in consideration of the geometric structure of the camera system, estimating an initial camera pose based on an adjacent image extracted from the 2D image link structure and a pair of corresponding feature points, reconstructing a 3D structure based on the initial camera pose, and estimating a final camera pose by performing correction so as to minimize a reprojection error of the reconstructed 3D structure; and memory for storing the final camera pose.

Here, the processor may reconstruct an initial 3D structure through triangulation using the initial camera pose and the pair of corresponding feature points, calculate the value of a cost function representing a mismatch between a 2D image and a 3D structure by reprojecting 3D points forming the initial 3D structure onto an individual view, and correct the initial camera pose and the initial 3D structure so as to decrease the value of the cost function.

Here, the processor may classify positions of camera views corresponding to the multi-view images into loops that do not overlap each other and select an adjacent image for each of the camera views corresponding to the multi-view images.

Here, the adjacent image may be an image having an overlapping view, the extent of which is equal to or greater than a preset extent.

Here, a collection of adjacent images corresponding to a specific camera view may include view images immediately preceding and following the specific camera view on a loop including the specific camera view, and when an adjacent view that does not correspond to the loop including the specific camera view is present, the collection may include at least one of view images immediately preceding and following the adjacent view on a loop including the adjacent view.

Here, the cost function may include a term for restricting a distance between cameras forming the camera system by imposing a penalty for a deviation in the distance between cameras.

Here, the processor may eliminate a 3D point outlier by setting a suitable depth range so as to correspond to a multiple of a distance between cameras forming the camera system.

Here, the processor may perform loop-closure-based accumulated error compensation based on a distance between cameras forming the camera system.

Here, the processor may estimate an essential matrix based on the pair of corresponding feature points and estimate the initial camera pose by decomposing the essential matrix.

BRIEF DESCRIPTION OF THE DRAWINGS

The above and other objects, features, and advantages of the present invention will be more clearly understood from the following detailed description taken in conjunction with the accompanying drawings, in which:

FIG. 10 is a view illustrating an example of correction performed so as to minimize a cost function according to the present invention;

DESCRIPTION OF THE PREFERRED EMBODIMENTS

Figure 1:
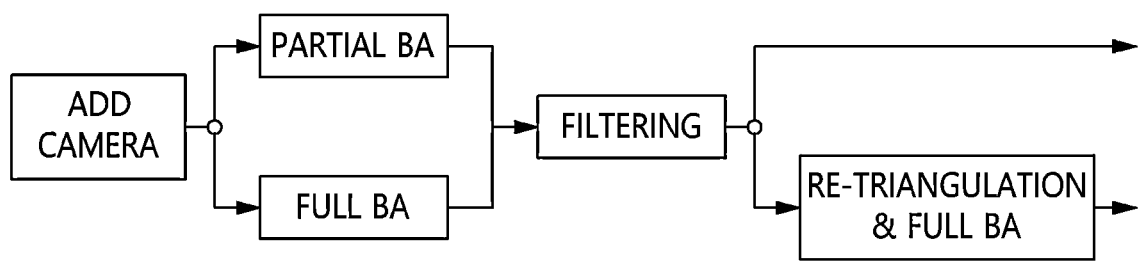
FIG. 1 is a view illustrating an example of a conventional camera pose estimation method.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

As conventional camera pose estimation techniques, with regard to Structure-from-Motion (SfM) research, there is research [1] for quickly and accurately estimating 3D information from multiple images and research [2] for precise 3D spatial information reconstruction.

The first type of research [1] is significant in that it aims at various speed optimizations in order to efficiently estimate 3D information based on a data set formed of thousands of images capturing a large outdoor space. First, feature points in each image are arranged in order of size and sampled to a fixed size, and most suitable parts thereof are checked, whereby the optimal correspondence may be identified.

Also, unlike in an existing method, bundle adjustment is applied to every fixed number of images in order to prevent accumulation of a reprojection error, which occurs whenever the size of a reconstructed 3D space increases.

$$\sum_{i}^{\infty} T_{BA}\left(\frac{n}{(1+r)^i}\right) = O\left(\sum_{i}^{\infty} \frac{n}{(1+r)^i}\right) = O\left(\frac{n}{r}\right) \quad (1)$$

As shown in Equation (1) above, speed optimization is accomplished by reducing $O(n^4)$ of the existing process to $O(n)$. Then, filtering is performed, and re-triangulation is performed on feature points that fail to form a pair of corresponding points, whereby a drifting problem arising from accumulation of camera pose errors may be solved.

Here, a reprojection error threshold value is increased, and re-triangulation (RT) is performed for a point having a large reprojection error or a pair of corresponding points having a small triangulation angle after a certain number of iterations are performed, as shown in FIG. 1.

Figure 2:
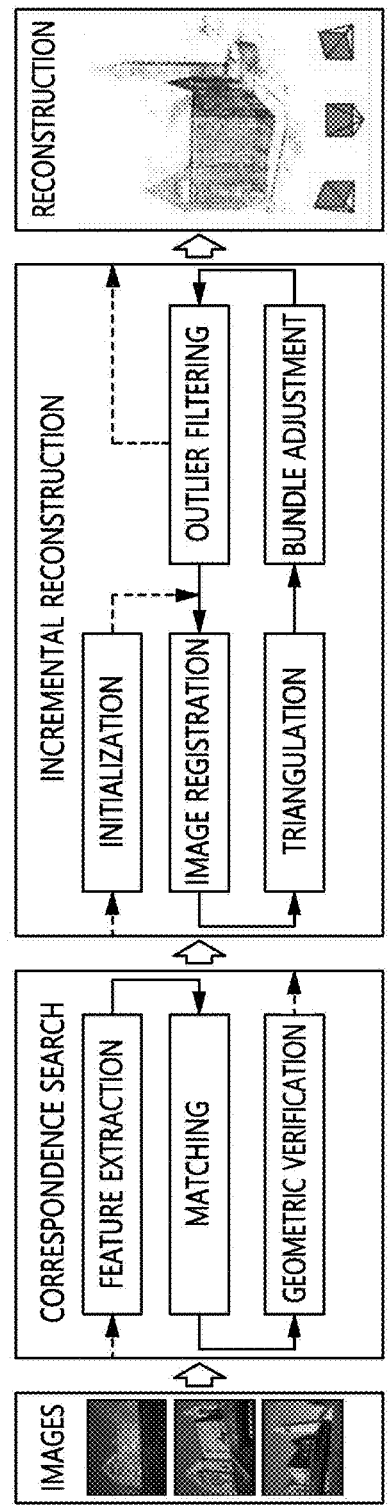
FIG. 2 is a view illustrating another example of the conventional camera pose estimation method.

Also, the second type of research [2] uses a method similar to the method of [1], as shown in FIG. 2, but is different from [1] in that it may also be applied to general images, such as pictures on the Internet, for which special camera parameters are not provided.

First, scene graph augmentation is performed in order to eliminate images having watermarks. Here, initialization is performed based on a fundamental matrix. Then, a group is formed by grouping images having a large overlapping area therebetween in order to select the best image, a score of a triangulated point of each group according to the resolution is accumulated, and images are selected in descending order of score.

Here, unlike in [1], an overlapping group that is not affected by bundle adjustment (BA) is parameterized, whereby a new BA cost function is defined as shown in Equation (2) below:

$$E_g = \sum_{j} \rho_j \left( \|\pi_g(G_r, P_c, X_k) - x_j\|_2^2 \right) \quad (2)$$

Also, triangulation is performed after outlier filtering is performed for the selected image through a RANSAC-based algorithm, whereby more robust triangulation is performed.

Finally, in [2], when re-triangulation (RT) is performed, re-triangulation is continuously performed on all accumulated errors below a certain reference value, unlike in [1], in which a threshold value for a reprojection error is increased.

The method of [2] has a limitation in that searching for a pair of corresponding points between various images in which the location information is not clear is required. That is, the algorithm has room for improvement by clarifying location information between images in consideration of large image datasets or by making it suitable for small datasets.

Accordingly, the present invention intends to propose a method for precisely estimating camera pose information based on multi-view images acquired from a camera structure having a physical location corresponding to a normalized 2D array.

The present invention to be described below relates to a method for precisely estimating a 3D pose pertaining to each of multi-view images acquired from a camera system capable of capturing images in a 2D array structure in consideration of the 2D geometric structure of the images.

That is, the accuracy of 3D information reconstruction may be improved using not only an existing progressive structure-from-motion method but also geometric information of an array structure, in which the structural characteristics of an imaging tool are taken into consideration, in each of a multi-view-based 3D space reconstruction process and an optimization process.

More specifically, the present invention intends to propose a method for estimating initial camera pose information and 3D spatial information in consideration both of an adjacent image located in the same row and of an adjacent image located in the same column in a 2D array in the process of sequentially forming a pair of corresponding feature points between adjacent images.

Also, the present invention intends to propose constraints on a relative rotation vector between adjacent cameras in consideration of the structural characteristics of an image array in the process of optimizing bundle adjustment of 3D parameters.

Accordingly, a camera pose may be estimated with high accuracy, and when the estimated pose is used for an algorithm for estimating a pixel-based depth map, a result that is more accurate than when the conventional method is used may be acquired. Also, estimation of camera pose information for more sophisticated mosaic-based omnidirectional imaging may be performed.

The method proposed hereinbelow provides four distinct differences from the conventional method.

First, when 3D spatial information is estimated from acquired images, the geometric structure of links of images in the form of a 2D array may be used when it is required to incrementally use a correspondence between the images, without excluding the possibility that various camera structures can be generally used.

Also, even when a small number of images is provided, a precise camera pose may be estimated by checking geometric links. Here, because a pair of corresponding feature points formed through matching of adjacent images, rather than feature points detected in common in all images, is used, there is an advantage in that it is easy to form a correspondence between feature points. This characteristic may be generally applied when corresponding pairs are connected, as in a camera system having a circular array, and may also be applied to various structures.

Also, constraints on a relative rotation vector between cameras are added based on geometric structure information in a bundle adjustment process, whereby faster and more accurate convergence to an optimization may be realized.

Finally, in addition to a method for eliminating a feature point outlier from a 2D image, a method for eliminating 3D point outliers from feature points depending on a distance in a 3D space, which is reconstructed in consideration of an indoor imaging environment, is performed.

Through the proposed method, camera parameters are estimated so as to correct camera position errors that can occur when actual cameras are arranged in 2D, and the camera positions are changed based on the estimated camera parameters, whereby conditions for the camera positions that have to be considered in an imaging step for forming accurate 3D spatial information may be satisfied.

Also, when estimated camera pose information is used as input for a depth map estimation algorithm, a better and more consistent depth map may be output based on the high precision of the estimated camera pose information.

Figure 3:
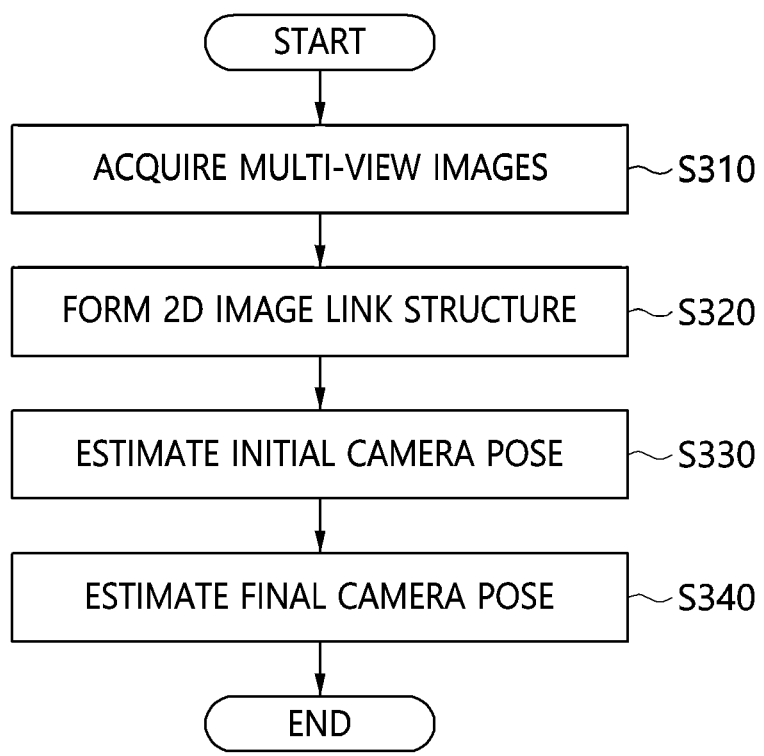
FIG. 3 is a flowchart illustrating a method for estimating a camera pose according to an embodiment of the present invention.

FIG. 3 is a flowchart illustrating a method for estimating a camera pose according to an embodiment of the present invention.

Referring to FIG. 3, in the method for estimating a camera pose according to an embodiment of the present invention, an apparatus for estimating a camera pose acquires multi-view images from a 2D array camera system at step S310.

Figure 5:
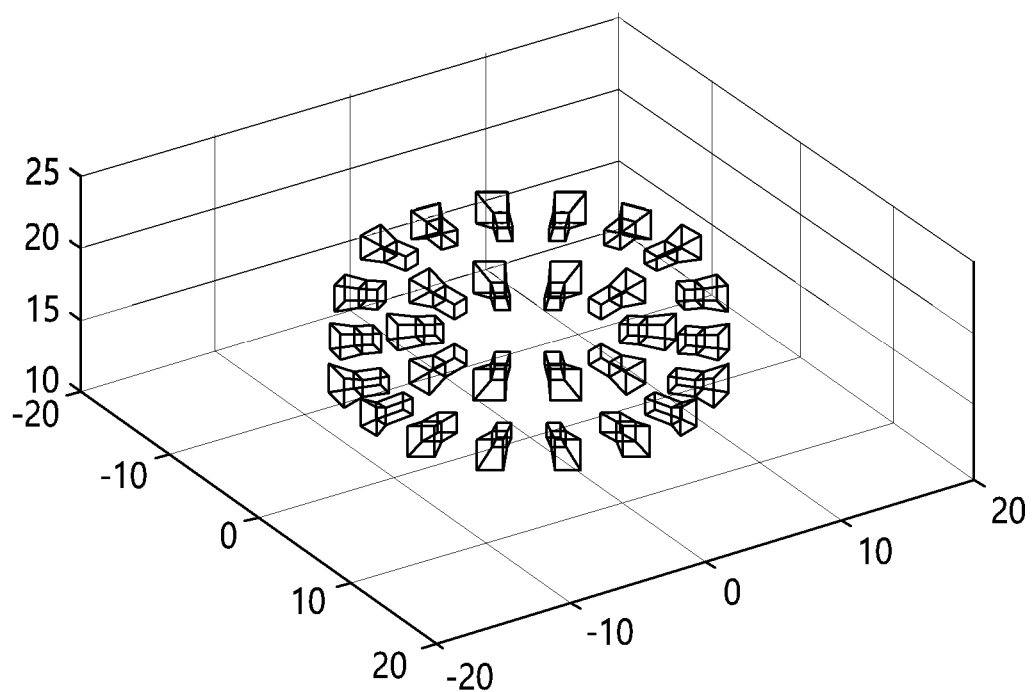
FIGS. 5 to 6 are views illustrating an example of a 2D array camera system according to the present invention.
Figure 6:
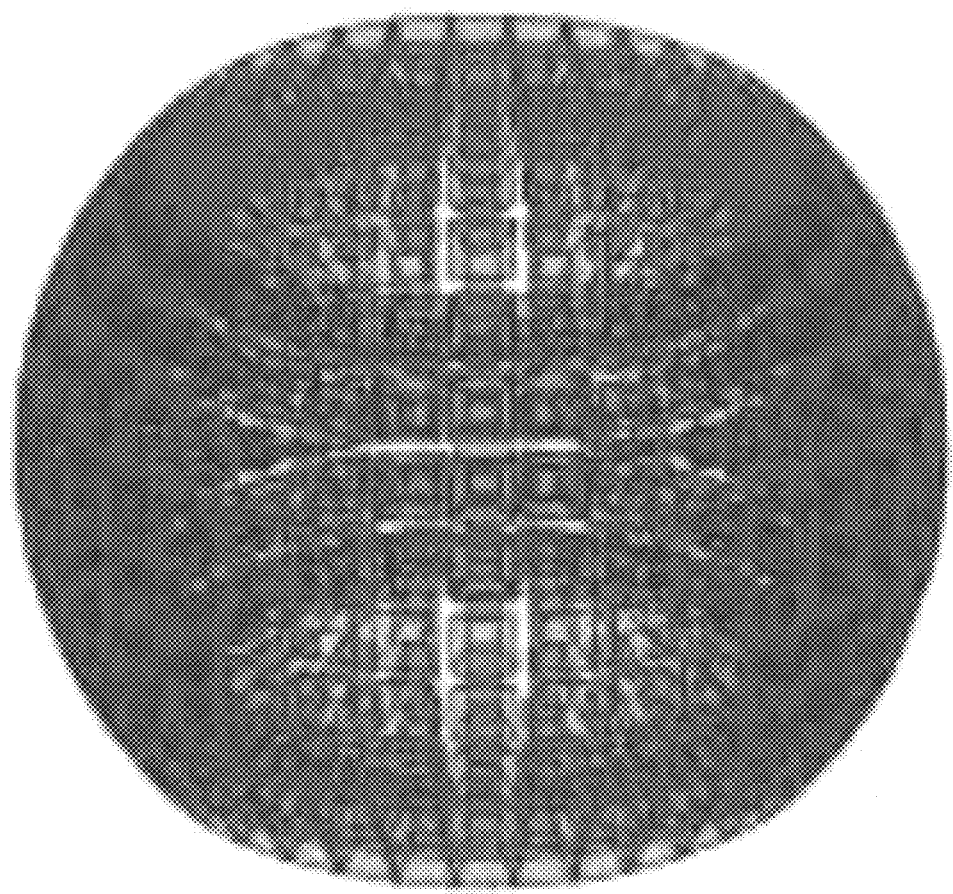

For example, the camera system may be any of various camera systems having the form of a circular loop having a 2D array in which cameras are located at fixed distances, regardless of the number of cameras, as illustrated in FIGS. 5 to 6.

Here, in the present invention, the 2D array form of the camera system may be used as a geometric structure of links between images.

Figure 4:
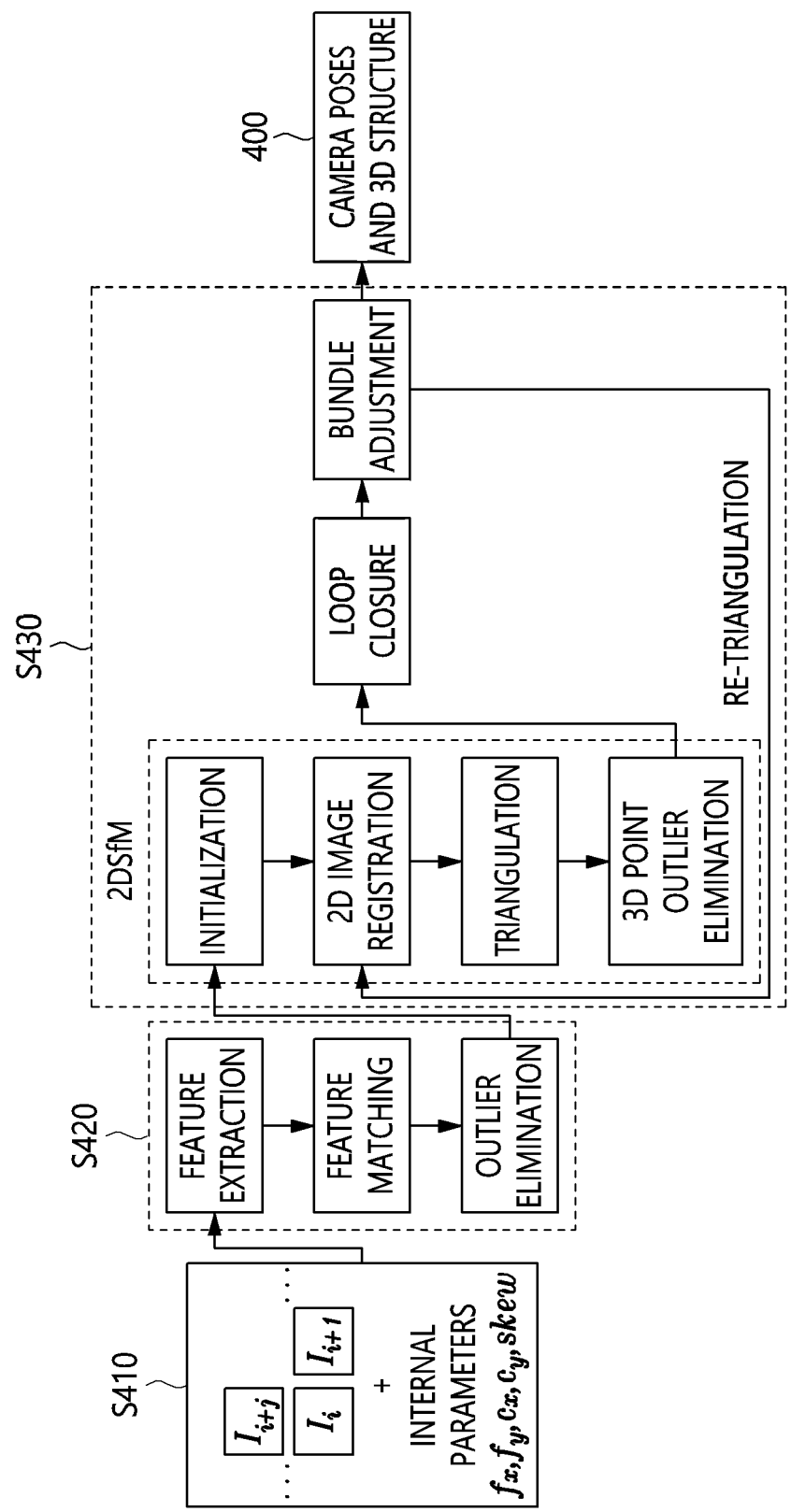
FIG. 4 is a view illustrating an example of a camera pose estimation process according to the present invention.

For example, referring to FIG. 4, the method for estimating a camera pose according to an embodiment of the present invention may be largely broken down into acquiring a collection of images at step S410, extracting feature points and matching images at step S420, and incrementally reconstructing a 3D structure and estimating a camera pose at step S430.

Here, when acquiring a collection of images is performed at step S410, images including an overlapping region therebetween and internal camera parameters corresponding to the respective images may be acquired.

Here, in the present invention, a collection of images may be acquired so as to correspond to a collection of loops that are separate from each other in order to correct the positions of the cameras based on loop closure.

For example, general camera auto-calibration methods using a chessboard or an absolute conic may be used for the internal camera parameters, and it may be assumed that lens distortion of an input image is sufficiently corrected through this process.

Also, in the method for estimating a camera pose according to an embodiment of the present invention, the apparatus for estimating a camera pose forms a 2D image link structure corresponding to the multi-view images in consideration of the geometric structure of the camera system at step S320.

For example, when an omnidirectional image is acquired, the connection of 3D points may be removed due to a change in the view point equal to or greater than 180°, and regeneration thereof may be repeated. Here, two view images do not overlap each other in many cases, which causes an accumulated error due to drift and separation of 3D points in a reconstruction process.

Accordingly, the present invention proposes initial camera pose estimation in units of loops.

It may be assumed that a view array is formed through a collection of loops in order to correct camera positions based on loop closure at the first step of the above-mentioned algorithm of the conventional technology. First, along a first loop, camera pose estimation based on corresponding points is performed. Then, a camera, the image of which overlaps the image of one of the cameras included in the first loop, is searched for in an additional loop, a relative pose is estimated, and the camera pose is registered along the additional loop. This process is repeated until relative pose estimation is completed once for all of the cameras, whereby initial camera pose estimation may be completed.

The result of initial camera pose estimation is vulnerable to the above-mentioned accumulated error, but the error may be reduced through loop-closure-based correction to be described later. However, the loop closure mechanism has a limitation in that mutual verification between different loops is limited because each loop is individually corrected.

In order to overcome this disadvantage, the present invention proposes a method using a 2D link structure.

Specifically, when a link of feature points in each of the views corresponding to multi-view images is searched for, a pair of corresponding feature points is searched for not only in the previous and next views on the path of a current loop but also in one or more adjacent views included in another loop, and the result may be reflected in the calculation of a cost function.

Here, the positions of camera views corresponding to the multi-view images are classified into loops that do not overlap each other, and an adjacent image may be selected for each of the camera views corresponding to the multi-view images.

Figure 7:
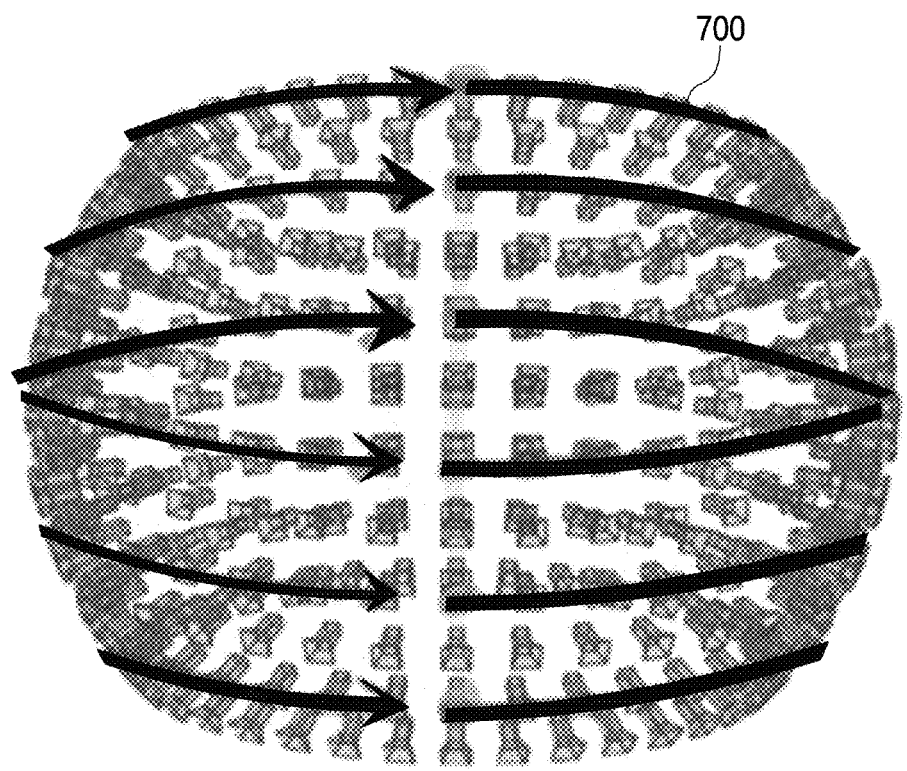
FIGS. 7 to 8 are views illustrating an example of a camera system of a loop unit and a 2D link structure according to the present invention.
Figure 8:
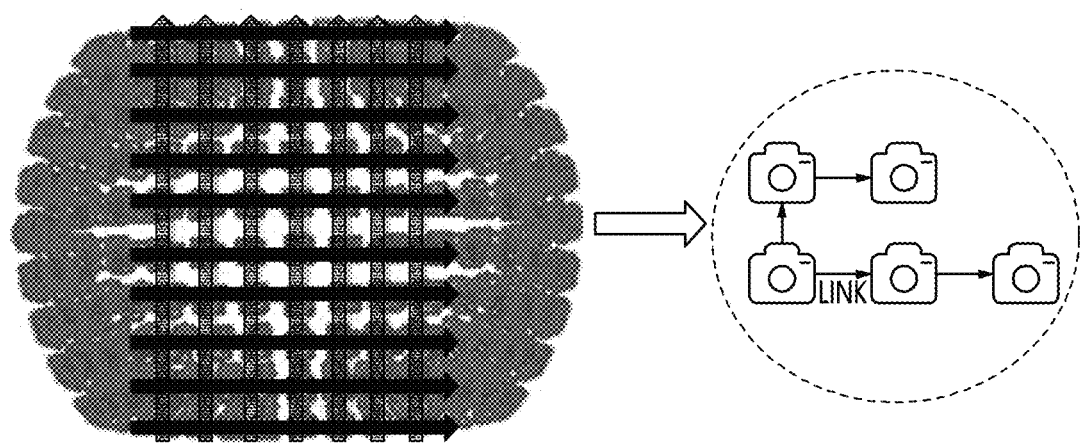
Figure 9:
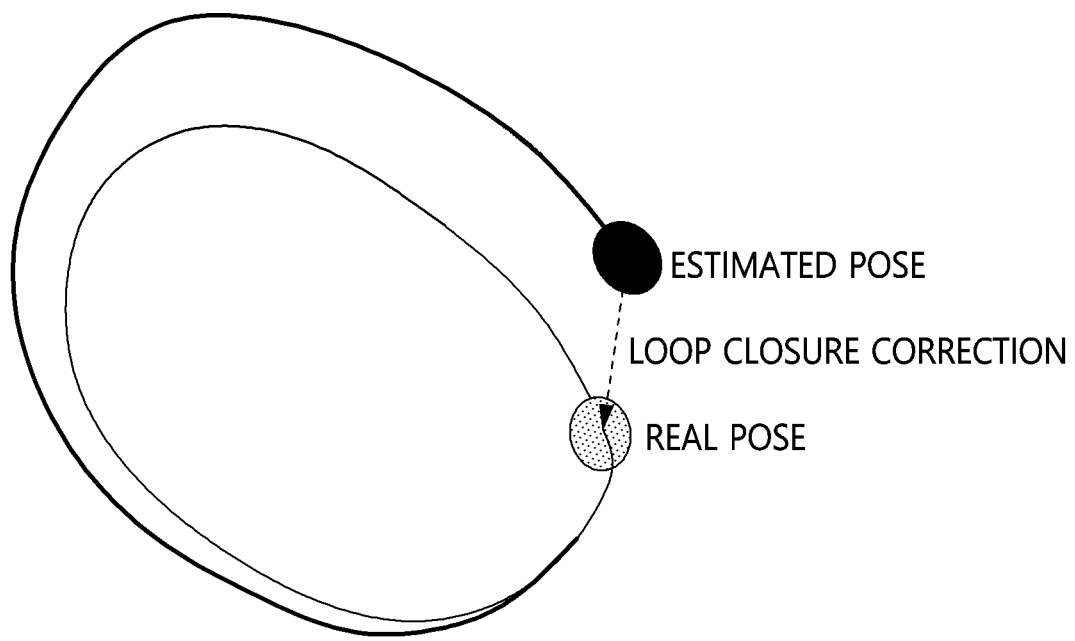
FIG. 9 is a view illustrating an example of the concept of loop closure according to the present invention.

For example, in the case of a 2D array camera system, a 2D link structure may be formed by defining neighboring views in the vertical direction as adjacent views, as illustrated in FIG. 8, in addition to the previous and next views on the path of the loop 700 in the horizontal direction, as illustrated in FIG. 7. Also, although not illustrated in the drawings, a 2D link structure may be alternatively formed by defining neighboring views in a spiral direction, along which the arrangement of views is minutely turned according to a change in the latitude, as adjacent views, as well as neighboring views in the horizontal or vertical direction.

When the 2D link structure is formed as described above, matching between loops is required for each view, whereby more accurate 3D reconstruction may be realized.

Therefore, an adjacent image according to the present invention may be an image having an overlapping view, the extent of which is equal to or greater than a preset extent.

Here, the preset extent may be related to a trade-off between the reliability of a pair of the corresponding feature points and the number of cameras in use, and may be set at the discretion of a designer.

Here, the collection of adjacent images corresponding to a specific camera view includes view images immediately preceding and following the specific camera view on the loop including the specific camera view, and when an adjacent view that does not correspond to the loop including the specific camera view is present, the collection may include at least one of view images immediately preceding and following the adjacent view on the loop including the adjacent view.

Here, the relationships between the adjacent views may be manually defined in the step (S410) of acquiring the collection of images, illustrated in FIG. 4, or may be automatically defined based on the initially estimated camera poses.

Also, in the method for estimating a camera pose according to an embodiment of the present invention, the apparatus for estimating a camera pose estimates an initial camera pose at step S330 based on the adjacent images extracted from the 2D image link structure and on the pair of corresponding feature points.

For example, in the step (S420) of extracting feature points and matching images, illustrated in FIG. 4, feature points may be detected in the images acquired from the 2D array camera system. Then, a 2D image link structure based on the camera system structure information in a regular grid form may be formed by matching the feature points between the images.

Here, the fact that the 2D image link is formed using the camera system structure information may mean that N(x), which is a set of views having feature points that match a feature point in view x, has three or more elements for every view x.

Here, the feature point may be acquired using a conventional invariant local feature point extraction algorithm such as SIFT or a local feature point extraction and description model based on an AI neural network.

Here, the pair of corresponding feature points may be extracted by applying a general descriptor-similarity-based matching and an outlier elimination method (RANSAC or the like).

Here, an essential matrix is estimated based on the pair of corresponding feature points, and the initial camera pose may be estimated by decomposing the essential matrix.

Also, in the method for estimating a camera pose according to an embodiment of the present invention, the apparatus for estimating a camera pose reconstructs a 3D structure based on the initial camera pose and corrects the same so as to minimize a reprojection error of the reconstructed 3D structure, thereby estimating a final camera pose at step S340.

For example, in the step (S430) of estimating a camera pose, illustrated in FIG. 4, the initial camera pose and the 3D structure are incrementally refined so as to minimize a reprojection error, whereby the final camera pose and the final 3D structure may be acquired.

Here, the initial 3D structure may be reconstructed through triangulation using the initial camera pose and the pair of corresponding feature points.

Here, the 3D points forming the 3D structure are reprojected onto an individual view, whereby the value of a cost function representing the mismatch between the 2D image and the 3D structure may be calculated.

Here, the initial camera pose and the initial 3D structure may be corrected so as to decrease the value of the cost function.

For example, as illustrated in FIG. 10, the sum of squares of reprojection errors on 2D images is defined as a cost function, and minimization of the cost function may be performed using the Levenberg-Marquardt method.

Here, the example illustrated in FIG. 10 may correspond to the case in which all of addition of a term for restricting the distance between cameras to the cost function, elimination of a 3D point outlier, and compensation of an accumulated error based on loop closure are implemented according to an embodiment of the present invention, and the implementation will be described in detail hereinbelow.

Here, the cost function may include a term for restricting the distance between cameras forming the camera system by imposing a penalty for a deviation in the distance between the cameras.

That is, when bundle adjustment for minimizing the cost function is performed, prior information about the structure is reflected, whereby efficiency may be improved.

For example, when bundle adjustment is applied, a small distance between views tends to cause an estimation result having low accuracy to be output due to the decreased reliability of triangulation, but a large distance between views tends to cause decreased accuracy because matching outliers frequently occur.

In order to mitigate these problems, the present invention proposes a method of adding a constraint term for providing prior information about the arrangement of camera views to a cost function.

Figure 11:
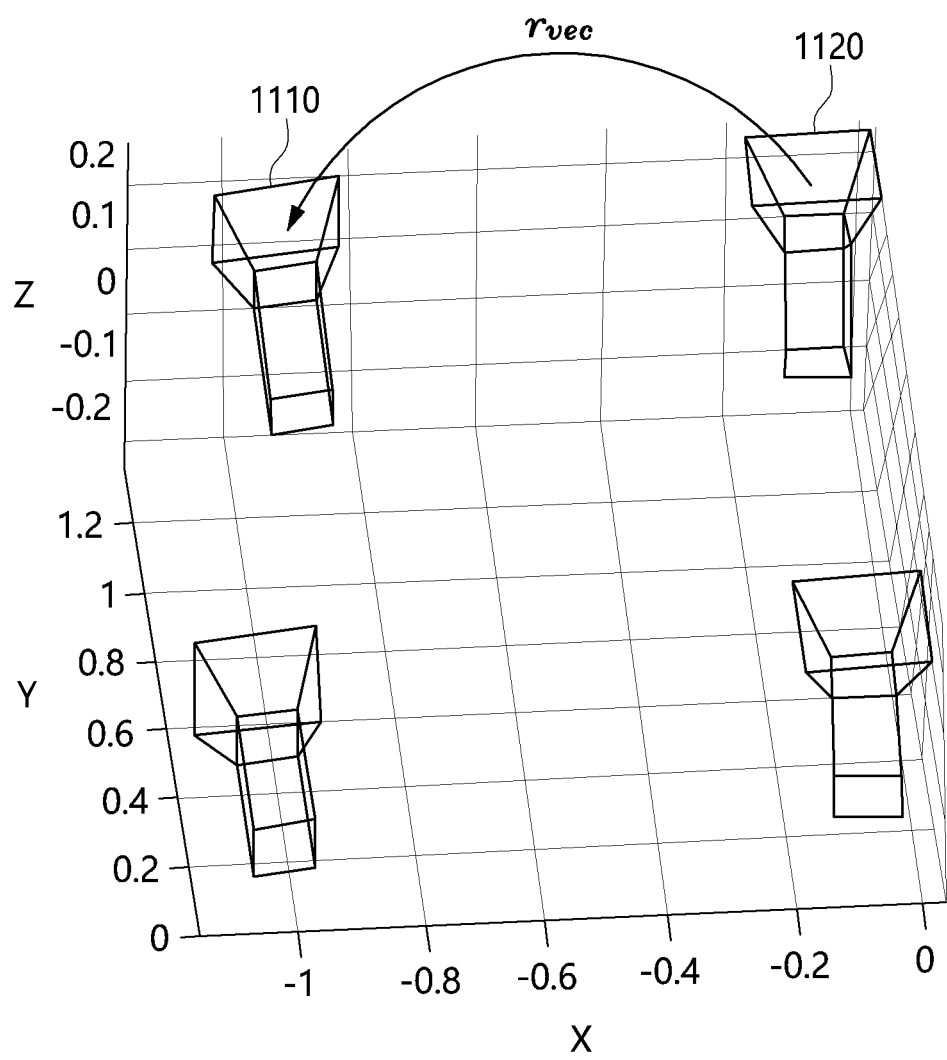
FIG. 11 is a view illustrating an example of bundle adjustment performed by adding a constraint term to a cost function according to the present invention.

For example, when prior information saying that the distance between views is almost uniform is given, as illustrated in FIG. 11, a constraint term for imposing a penalty for a deviation in the distance between views may be added, as shown in Equation (3) below:

$$E_{new} = \|x - PX\|_2^2 + \lambda D_{constraint} \quad (3)$$

$$D_{constraint} = \sum_{n=1}^{N} \|d_{r_n} - d_{\bar{r}}\|_2^2$$

$$d_{r_n} = |r_n - r_{n-1}|$$

$$d_{\bar{r}} = \frac{1}{N} \sum_{n=1}^{N} d_{r_n}$$

When this constraint term is added to the cost function, the convergence speed and accuracy may be improved.

Here, a suitable depth range is set to a multiple of the distance between cameras forming the camera system, whereby 3D point outliers may be eliminated.

Generally, incorrect matching of feature points often results in an abnormally large depth value or a negative depth value, and some outliers may be eliminated through depth-value-based filtering.

Here, because the Structure from Motion (SfM) algorithm is inadequate to reconstruct the scale of a 3D structure, it is difficult to automatically set a suitable depth value range. However, using the prior information about the distance between cameras, the suitable depth value range may be easily set to a multiple of the distance between cameras.

Figure 12:
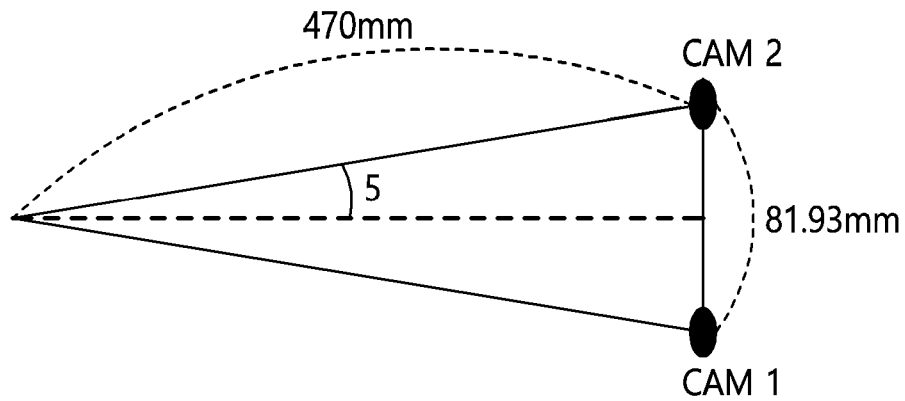
FIG. 12 is a view illustrating an example of the method of setting a range when 3D point outliers are eliminated according to the present invention.

For example, using information about the distance between cameras (81.93 mm), as illustrated in FIG. 12, the limit on the maximum depth may be set to 8.193 m, which is 100 times 81.93 mm, which is the distance between Cam1 and Cam2.

Here, loop-closure-based accumulated error compensation may be performed based on the distance between cameras forming the camera system.

Generally, when camera pose estimation is repeatedly performed for multiple images, errors may be accumulated.

For example, an error may be accumulated due to the characteristics of the Levenberg-Marquardt algorithm, in which the accuracy of initial values is important, and the camera parameters and 3D points may not converge due to the accumulated error even after a bundle adjustment scheme is applied.

In order to resolve the accumulated error (drift), the present invention applies a loop closure scheme for detecting whether a series of camera views forms a loop when the same views are revisited.

Figure 13:
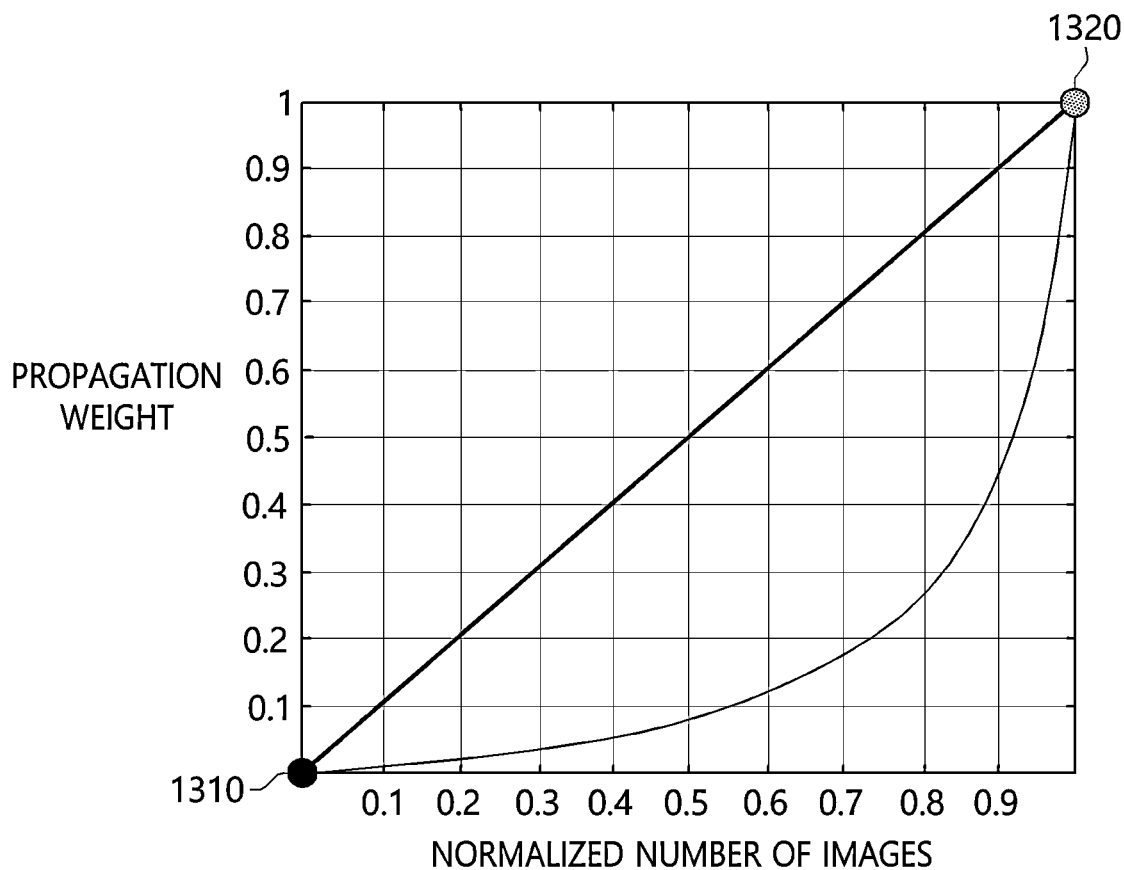
FIG. 13 is a view illustrating an example of an error in a structure in which a loop is not formed due to the error according to the present invention.

Generally, loop closure may be configured with a loop detection process for determining the same views and a loop correction process for resolving a structural error in which a loop is not formed due to the error, as illustrated in FIG. 13.

In a general loop closure scheme applied in an environment in which there is no information about camera views, information about whether closure of a loop is completed is unavailable. Accordingly, whether a loop is formed may be detected through a loop detection process. Here, this process has to be performed whenever an additional view is considered, which may cause a bottleneck from the aspect of processing speed.

Accordingly, in the present invention, a loop is predefined using information about the distance between views, whereby the loop detection process may be skipped.

Also, in order to perform loop correction, the relative transformation relationship between the last image and the first image of the loop is applied using the previously recognized loop structure, and an error may be interpolated using the error between the parameters of the first image.

Here, in order to interpolate the camera pose information error and the camera position information error, a spherical linear interpolation (Slerp)-based correction process may be applied.

Here, because the pose estimation error is accumulated in the form of an exponential function, the correction value 1320 of the last image (the correction value of the end point) is set to 1 and the correction value 1310 of the first image (the correction value of the start point) is set to 0, as shown in Equation (4) and FIG. 13, whereby images in the vicinity of the last point with respect to the pieces of intermediate pose information may be corrected.

$$P_{corr} = Slerp_i(T_{loop_i} P_i), \text{ where } i \in L \qquad (4)$$

$$y(Slerp) = \frac{x}{1 + \alpha(1-x)}$$

Figure 14:
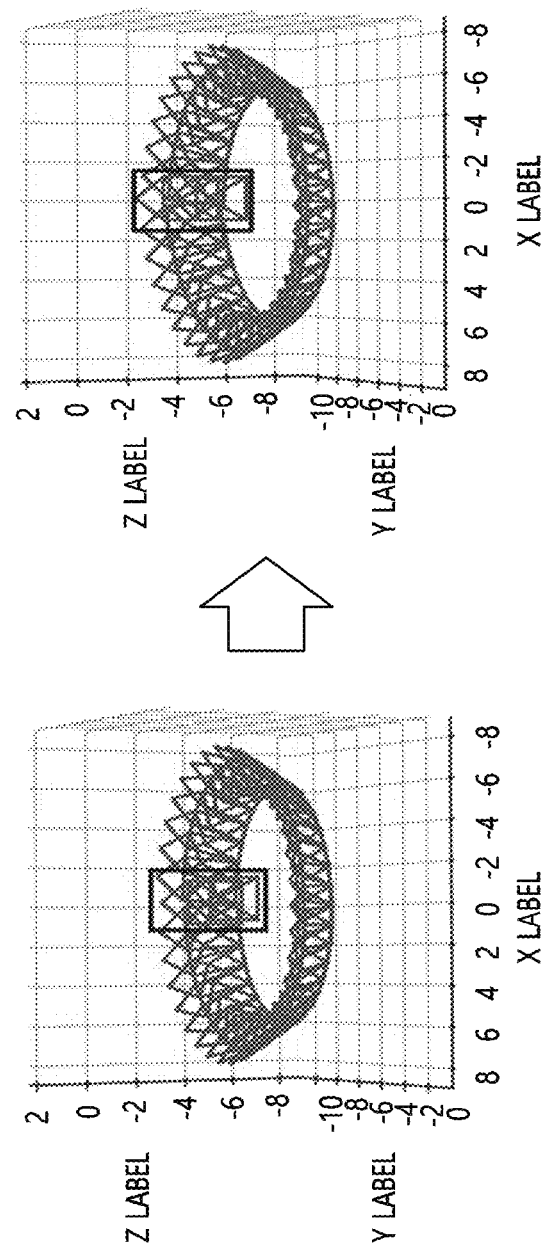
FIG. 14 is a view illustrating an example of application of loop closure for an omnidirectional image according to the present invention.

Here, L in Equation (4) denotes an index of every image forming a loop, and Slerp may indicate a method for interpolating camera pose information depending on variation in an angle and interpolating camera position information depending on variation in a position. Also, a may be a parameter that is set experimentally. FIG. 14 is an example of the results of camera pose estimation depending on whether loop closure is applied.

Using the above-described method for estimating a camera pose, camera pose information estimation for mosaic-based omnidirectional imaging that is more sophisticated than the conventional technology may be performed.

Also, a precise 3D pose of a camera pertaining to each of multi-view images, acquired from a camera system capable of capturing images in a 2D array structure, may be estimated in consideration of the 2D geometric structure between the images.

Also, the accuracy of 3D information reconstruction may be improved using not only an existing progressive structure-from-motion method but also geometric information of an array structure, in which the structural characteristics of an imaging tool are taken into consideration, in each of a multi-view-based 3D space reconstruction process and an optimization process.

Also, a pair of corresponding feature points between adjacent images is formed in consideration not only of an adjacent image located in the same row in a 2D array but also of an adjacent image located in the same column in the 2D array, whereby initial camera pose information and 3D spatial information may be precisely estimated.

Also, a camera pose may be estimated with high accuracy by proposing constraints on a relative rotation vector between adjacent cameras through the process of optimizing bundle adjustment of 3D parameters, and when an algorithm for estimating a pixel-based depth map using the estimated pose is used, a more accurate result may be acquired.

Figure 15:
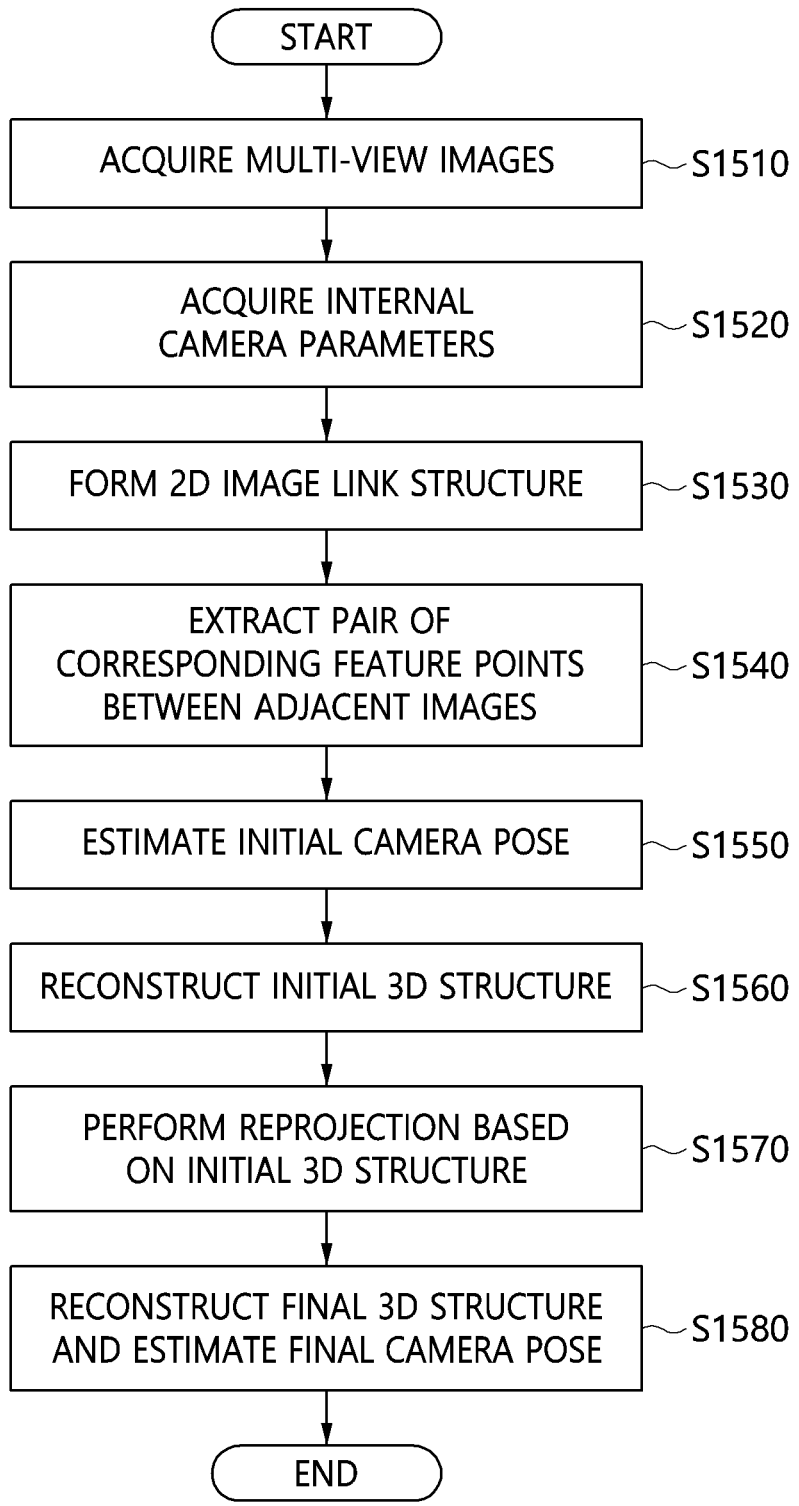
FIG. 15 is a flowchart illustrating in detail a method for estimating a camera pose according to an embodiment of the present invention.

FIG. 15 is a flowchart illustrating in detail a method for estimating a camera pose according to an embodiment of the present invention.

Referring to FIG. 15, in the method for estimating a camera pose according to an embodiment of the present invention, first, multi-view images and internal camera parameters may be acquired from a 2D array camera system at steps S1510 and S1520.

Subsequently, a 2D image link structure corresponding to the multi-view images may be formed in consideration of the geometric structure of the camera system at step S1530.

Subsequently, a pair of corresponding feature points between adjacent images in the 2D image link structure is extracted at step S1540, and an initial camera pose may be estimated based on the pair of corresponding feature points at step S1550.

Here, an essential matrix is estimated based on the pair of corresponding feature points, and the initial camera pose may be estimated by decomposing the essential matrix.

Subsequently, triangulation using the initial camera pose and the pair of corresponding feature points is performed, whereby an initial 3D structure may be reconstructed at step S1560.

Subsequently, the value of a cost function is calculated by reprojecting 3D points forming the 3D structure onto individual views at step S1570, and the initial camera pose and the initial 3D structure are corrected so as to decrease the value of the cost function, whereby a final 3D structure may be reconstructed and a final camera pose may be estimated at step S1580.

Figure 16:
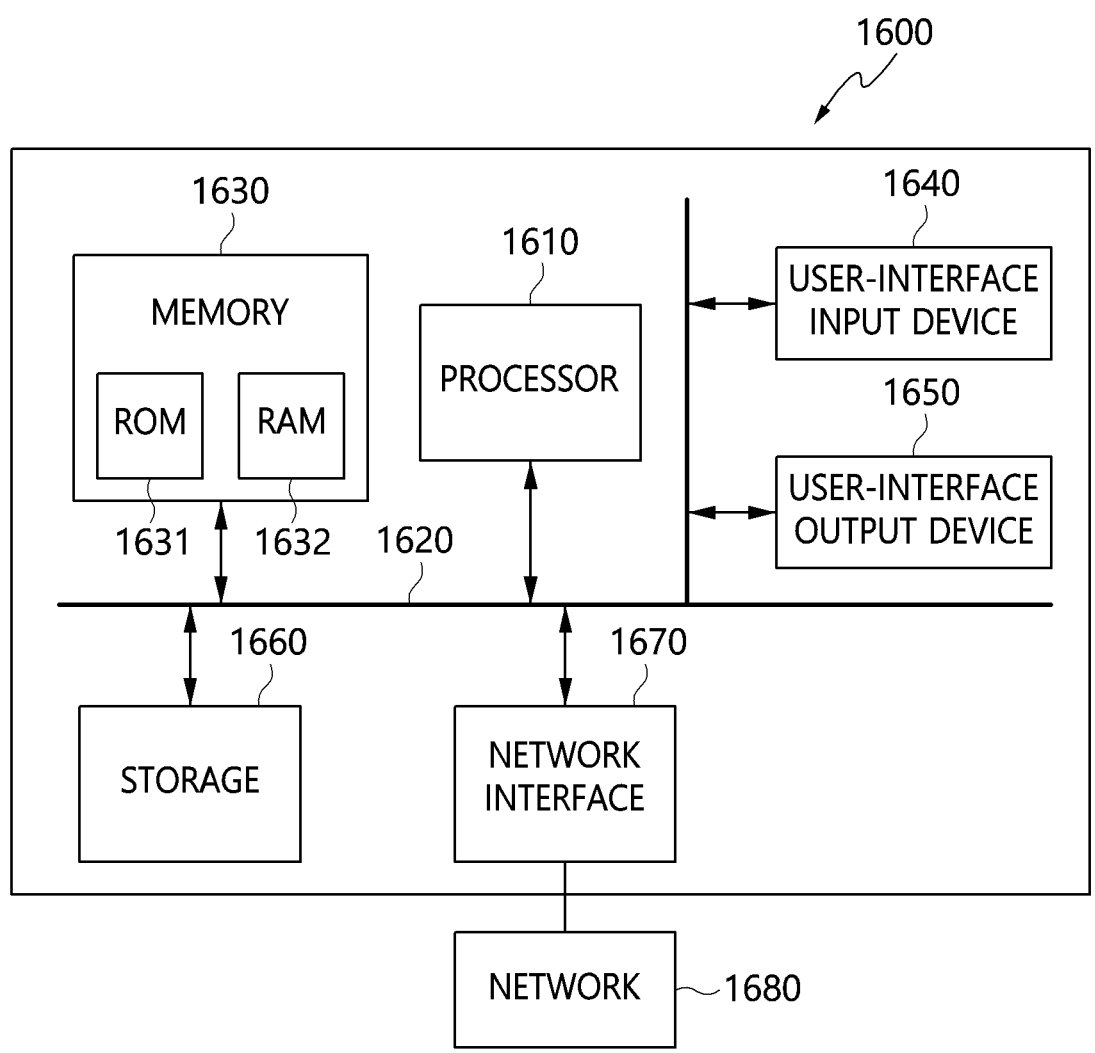
FIG. 16 is a block diagram illustrating an apparatus for estimating a camera pose according to an embodiment of the present invention.

FIG. 16 is a block diagram illustrating an apparatus for estimating a camera pose according to an embodiment of the present invention.

Referring to FIG. 16, the apparatus for estimating a camera pose according to an embodiment of the present invention may be implemented as a computer system 1600 including a computer-readable recording medium. As illustrated in FIG. 16, the computer system 1600 may include one or more processors 1610, memory 1630, a user-interface input device 1640, a user-interface output device 1650, and storage 1660, which communicate with each other via a bus 1620. Also, the computer system 1600 may further include a network interface 1670 connected to a network 1680. The processor 1610 may be a central processing unit or a semiconductor device for executing processing instructions stored in the memory 1630 or the storage 1660. The memory 1630 and the storage 1660 may be any of various types of volatile or nonvolatile storage media. For example, the memory may include ROM 1631 or RAM 1632.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

The processor 1610 acquires multi-view images from a 2D array camera system.

Also, the processor 1610 forms a 2D image link structure corresponding to the multi-view images in consideration of the geometric structure of the camera system.

Here, the positions of camera views corresponding to the multi-view images are classified into loops that do not overlap each other, and an adjacent image may be selected for each of the camera views corresponding to the multi-view images.

Also, the processor 1610 estimates an initial camera pose based on the adjacent image extracted from the 2D image link structure and a pair of corresponding feature points.

Here, the adjacent image may be an image having an overlapping view, the extent of which is equal to or greater than a preset extent.

Here, a collection of adjacent images corresponding to a specific camera view includes view images immediately preceding and following the specific camera view on the loop including the specific camera view, and when an adjacent view that does not correspond to the loop including the specific camera view is present, the collection may include at least one of view images immediately preceding and following the adjacent view on the loop including the adjacent view.

Here, an essential matrix is estimated based on the pair of corresponding feature points, and the essential matrix is decomposed, whereby an initial camera pose may be estimated.

Also, the processor 1610 reconstructs a 3D structure based on the initial camera pose and performs correction so as to minimize a reprojection error of the reconstructed 3D structure, thereby estimating a final camera pose.

Here, an initial 3D structure may be reconstructed through triangulation using the initial camera pose and the pair of corresponding feature points.

Here, 3D points forming the initial 3D structure are reprojected onto an individual view, whereby the value of a cost function representing the mismatch between the 2D image and the 3D structure may be calculated.

Here, the initial camera pose and the initial 3D structure may be corrected so as to decrease the value of the cost function.

Here, the cost function may include a term for restricting the distance between cameras by imposing a penalty for a deviation in the distance between cameras forming the camera system.

Here, a suitable depth range is set so as to correspond to a multiple of the distance between the cameras forming the camera system, whereby 3D point outliers may be eliminated.

Here, loop-closure-based accumulated error compensation may be performed based on the distance between cameras forming the camera system.

The memory 1630 stores the final camera pose.

Also, the memory 1630 stores various kinds of information generated in the above-described apparatus for estimating a camera pose according to an embodiment of the present invention.

According to an embodiment, the memory 1630 may be separate from the apparatus for estimating a camera pose, and may support the function for estimating a camera pose. Here, the memory 1630 may operate as separate mass storage, and may include a control function for performing operations.

Meanwhile, the apparatus for estimating a camera pose includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

Using the above-described apparatus for estimating a camera pose, camera pose information estimation for mosaic-based omnidirectional imaging that is more sophisticated than the conventional technology may be performed.

Also, a precise 3D pose of a camera pertaining to each of multi-view images, acquired from a camera system capable of capturing images in a 2D array structure, may be estimated in consideration of the 2D geometric structure between the images.

Also, the accuracy of 3D information reconstruction may be improved using not only an existing progressive structure-from-motion method but also geometric information of an array structure, in which the structural characteristics of an imaging tool are taken into consideration, in each of a multi-view-based 3D space reconstruction process and an optimization process.

Also, a pair of corresponding feature points between adjacent images is formed in consideration not only of an adjacent image located in the same row in a 2D array but also of an adjacent image located in the same column in the 2D array, whereby initial camera pose information and 3D spatial information may be precisely estimated.

Also, a camera pose may be estimated with high accuracy by proposing constraints on a relative rotation vector between adjacent cameras through the process of optimizing bundle adjustment of 3D parameters, and when an algorithm for estimating a pixel-based depth map using the estimated pose is used, a more accurate result may be acquired.

According to the present invention, a method for estimating camera pose information for mosaic-based omnidirectional imaging that is more sophisticated than the conventional technology may be provided.

Also, the present invention may enable a 3D pose of a camera pertaining to each of multi-view images acquired from a camera system capable of capturing images in a 2D array structure to be precisely estimated in consideration of the 2D geometric structure of the images.

Also, the present invention may improve the accuracy of 3D information reconstruction using not only an existing progressive structure-from-motion method but also geometric information of an array structure, in which the structural characteristics of an imaging tool are taken into consideration, in each of a multi-view-based 3D space reconstruction process and an optimization process.

Also, the present invention may enable a pair of corresponding feature points between adjacent images to be formed in consideration not only of an adjacent image located in the same row in a 2D array but also of an adjacent image located in the same column in the 2D array, thereby precisely estimating initial camera pose information and 3D spatial information.

Also, the present invention may enable a camera pose to be estimated with high accuracy by proposing constraints on a relative rotation vector between adjacent cameras through the process of optimizing bundle adjustment of 3D parameters, and when the estimated pose is used for an algorithm for estimating a pixel-based depth map, a more accurate result may be acquired.

As described above, the apparatus for estimating a camera pose using multi-view images of a 2D array structure and the method using the same according to the present invention are not limitedly applied to the configurations and operations of the above-described embodiments, but all or some of the embodiments may be selectively combined and configured, so the embodiments may be modified in various ways.

What is claimed is:

1. A method for estimating a camera pose performed by an apparatus for estimating a camera pose, comprising:

acquiring multi-view images from a 2D array camera system;

forming a 2D image link structure corresponding to the multi-view images in consideration of a geometric structure of the camera system;

estimating an initial camera pose based on an adjacent image extracted from the 2D image link structure and a pair of corresponding feature points; and reconstructing a 3D structure based on the initial camera pose and estimating a final camera pose by performing correction so as to minimize a reprojection error of the reconstructed 3D structure, wherein forming the 2D image link structure includes classifying positions of camera views corresponding to the multi-view images into loops that do not overlap each other; and selecting an adjacent image for each of the camera views corresponding to the multi-view images.

2. The method of claim 1, wherein estimating the final camera pose includes reconstructing an initial 3D structure through triangulation using the initial camera pose and the pair of corresponding feature points;

calculating a value of a cost function representing a mismatch between a 2D image and a 3D structure by reprojecting 3D points forming the initial 3D structure onto an individual view; and correcting the initial camera pose and the initial 3D structure so as to decrease the value of the cost function.

3. The method of claim 1, wherein the adjacent image is an image having an overlapping view, an extent of which is equal to or greater than a preset extent.

4. The method of claim 1, wherein a collection of adjacent images corresponding to a specific camera view includes view images immediately preceding and following the specific camera view on a loop including the specific camera view, and when an adjacent view that does not correspond to the loop including the specific camera view is present, the collection includes at least one of view images immediately preceding and following the adjacent view on a loop including the adjacent view.

5. The method of claim 2, wherein the cost function includes a term for restricting a distance between cameras forming the camera system by imposing a penalty for a deviation in the distance between cameras.

6. The method of claim 2, wherein correcting the initial camera pose and the initial 3D structure includes eliminating a 3D point outlier by setting a suitable depth range so as to correspond to a multiple of a distance between cameras forming the camera system.

7. The method of claim 2, wherein correcting the initial camera pose and the initial 3D structure includes performing loop-closure-based accumulated error compensation based on a distance between cameras forming the camera system.

8. The method of claim 1, wherein estimating the initial camera pose comprises estimating an essential matrix based on the pair of corresponding feature points and estimating the initial camera pose by decomposing the essential matrix.

9. An apparatus for estimating a camera pose, comprising:

a processor for acquiring multi-view images from a 2D array camera system, forming a 2D image link structure corresponding to the multi-view images in consideration of a geometric structure of the camera system, estimating an initial camera pose based on an adjacent image extracted from the 2D image link structure and a pair of corresponding feature points, reconstructing a 3D structure based on the initial camera pose, and estimating a final camera pose by performing correction so as to minimize a reprojection error of the reconstructed 3D structure; and memory for storing the final camera pose, wherein the processor classifies positions of camera views corresponding to the multi-view images into loops that do not overlap each other and selects an adjacent image for each of the camera views corresponding to the multi-view images.

10. The apparatus of claim 9, wherein the processor reconstructs an initial 3D structure through triangulation using the initial camera pose and the pair of corresponding feature points, calculates a value of a cost function representing a mismatch between a 2D image and a 3D structure by reprojecting 3D points forming the initial 3D structure onto an individual view, and corrects the initial camera pose and the initial 3D structure so as to decrease the value of the cost function.

11. The apparatus of claim 9, wherein the adjacent image is an image having an overlapping view, an extent of which is equal to or greater than a preset extent.

12. The apparatus of claim 11, wherein a collection of adjacent images corresponding to a specific camera view includes view images immediately preceding and following the specific camera view on a loop including the specific camera view, and when an adjacent view that does not correspond to the loop including the specific camera view is present, the collection includes at least one of view images immediately preceding and following the adjacent view on a loop including the adjacent view.

13. The apparatus of claim 10, wherein the cost function includes a term for restricting a distance between cameras forming the camera system by imposing a penalty for a deviation in the distance between cameras.

14. The apparatus of claim 10, wherein the processor eliminates a 3D point outlier by setting a suitable depth range so as to correspond to a multiple of a distance between cameras forming the camera system.

15. The apparatus of claim 10, wherein the processor performs loop-closure-based accumulated error compensation based on a distance between cameras forming the camera system.

16. The apparatus of claim 9, wherein the processor estimates an essential matrix based on the pair of corresponding feature points and estimates the initial camera pose by decomposing the essential matrix.

* * * * *